United States Patent
Saruwatari et al.

(10) Patent No.: US 9,263,747 B2
(45) Date of Patent: Feb. 16, 2016

(54) POSITIVE ELECTRODE, NONAQUEOUS ELECTROLYTE BATTERY AND BATTERY PACK

(71) Applicant: KABUSHIKI KAISHA TOSHIBA, Minato-ku (JP)

(72) Inventors: Hidesato Saruwatari, Saku (JP); Yoshiyuki Isozaki, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 13/969,105

(22) Filed: Aug. 16, 2013

(65) Prior Publication Data
US 2013/0330613 A1 Dec. 12, 2013

Related U.S. Application Data

(63) Continuation of application No. PCT/JP2012/053842, filed on Feb. 17, 2012.

(30) Foreign Application Priority Data

Feb. 18, 2011 (JP) .................. 2011-033442

(51) Int. Cl.
*H01M 2/00* (2006.01)
*H01M 4/66* (2006.01)
(Continued)

(52) U.S. Cl.
CPC .............. *H01M 4/661* (2013.01); *H01M 4/131* (2013.01); *H01M 4/505* (2013.01); *H01M 4/525* (2013.01); *H01M 10/052* (2013.01); *Y02E 60/122* (2013.01); *Y02T 10/7011* (2013.01)

(58) Field of Classification Search
CPC ...... H01M 4/131; H01M 4/505; H01M 4/525
USPC .............................. 429/231.95, 211
See application file for complete search history.

(56) References Cited

U.S. PATENT DOCUMENTS

2006/0204845 A1 9/2006 Chang et al.
2007/0009797 A1 1/2007 Takami et al.
(Continued)

FOREIGN PATENT DOCUMENTS

CN 1893167 A 1/2007
CN 101128949 A 2/2008
(Continued)

OTHER PUBLICATIONS

International Search Report mailed May 22, 2012, in PCT/JP2012/053842 filed Feb. 17, 2012.
(Continued)

*Primary Examiner* — Cynthia H Kelly
*Assistant Examiner* — Monique Wills
(74) *Attorney, Agent, or Firm* — Oblon, McClelland, Maier & Neustadt, L.L.P.

(57) ABSTRACT

According to one embodiment, a positive electrode includes a positive electrode material layer and a positive electrode current collector. The positive electrode material layer includes a positive electrode active material having a composition represented by a formula (1) described below. The positive electrode material layer satisfies a formula (2) described below. The positive electrode material layer is formed on the positive electrode current collector.

$$Li_xNi_{1-a-b}Co_aM_bO_2 \quad (1)$$

$$35 \leq S1/V1 \leq 70 \quad (2)$$

15 Claims, 8 Drawing Sheets

(51) Int. Cl.
  *H01M 4/131*   (2010.01)
  *H01M 4/505*   (2010.01)
  *H01M 4/525*   (2010.01)
  *H01M 10/052*  (2010.01)

(56) References Cited

U.S. PATENT DOCUMENTS

| | | |
|---|---|---|
| 2007/0009801 A1 | 1/2007 | Inagaki et al. |
| 2008/0176142 A1 | 7/2008 | Inagaki et al. |
| 2009/0104517 A1 | 4/2009 | Yuasa et al. |
| 2010/0276217 A1 | 11/2010 | Sugaya et al. |
| 2011/0053004 A1 | 3/2011 | Saruwatari et al. |
| 2012/0270093 A1 | 10/2012 | Isozaki et al. |
| 2013/0280586 A1* | 10/2013 | Isozaki et al. ............ 429/156 |

FOREIGN PATENT DOCUMENTS

| | | |
|---|---|---|
| CN | 101414675 A | 4/2009 |
| CN | 101427416 A | 5/2009 |
| CN | 102511104 A | 6/2012 |
| JP | 10-255763 A | 9/1998 |
| JP | 2003-168434 A | 6/2003 |
| JP | 2004-79327 A | 3/2004 |
| JP | 2005-251684 A | 9/2005 |
| JP | 2006-127923 A | 5/2006 |
| JP | 2007-18863 A | 1/2007 |
| JP | 2007-18882 A | 1/2007 |
| JP | 2008-41402 A | 2/2008 |
| JP | 2008-108692 A | 5/2008 |
| JP | 2008-532221 A | 8/2008 |
| JP | 2009-224288 A | 10/2009 |
| WO | 2009/139157 A1 | 11/2009 |
| WO | 2011/108106 A1 | 9/2011 |

OTHER PUBLICATIONS

Combined Chinese Office Action and Search Report issued Jan. 4, 2015 in Patent Application No. 201280004876.2 (with English language translation).

* cited by examiner

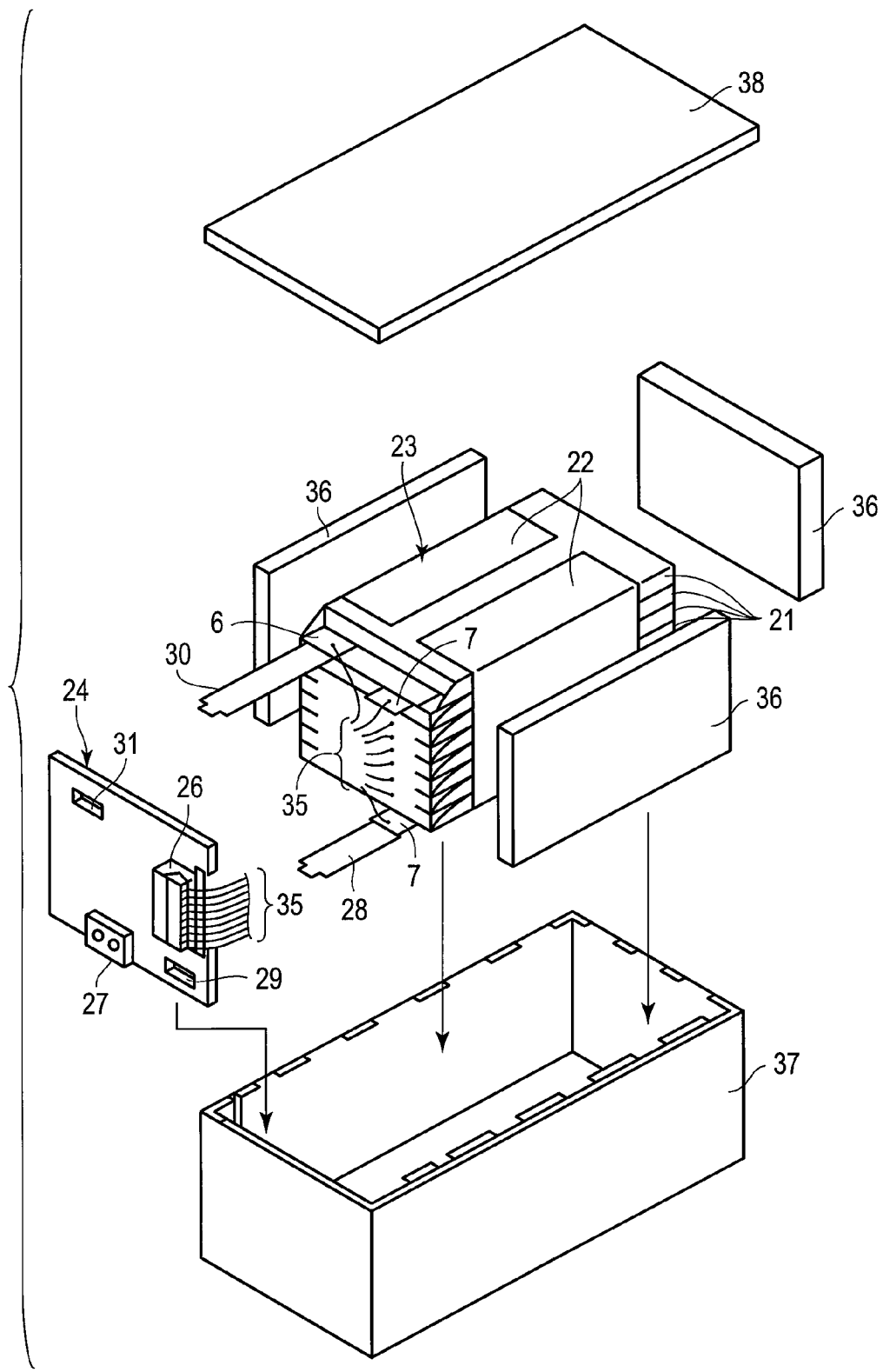
F I G. 3

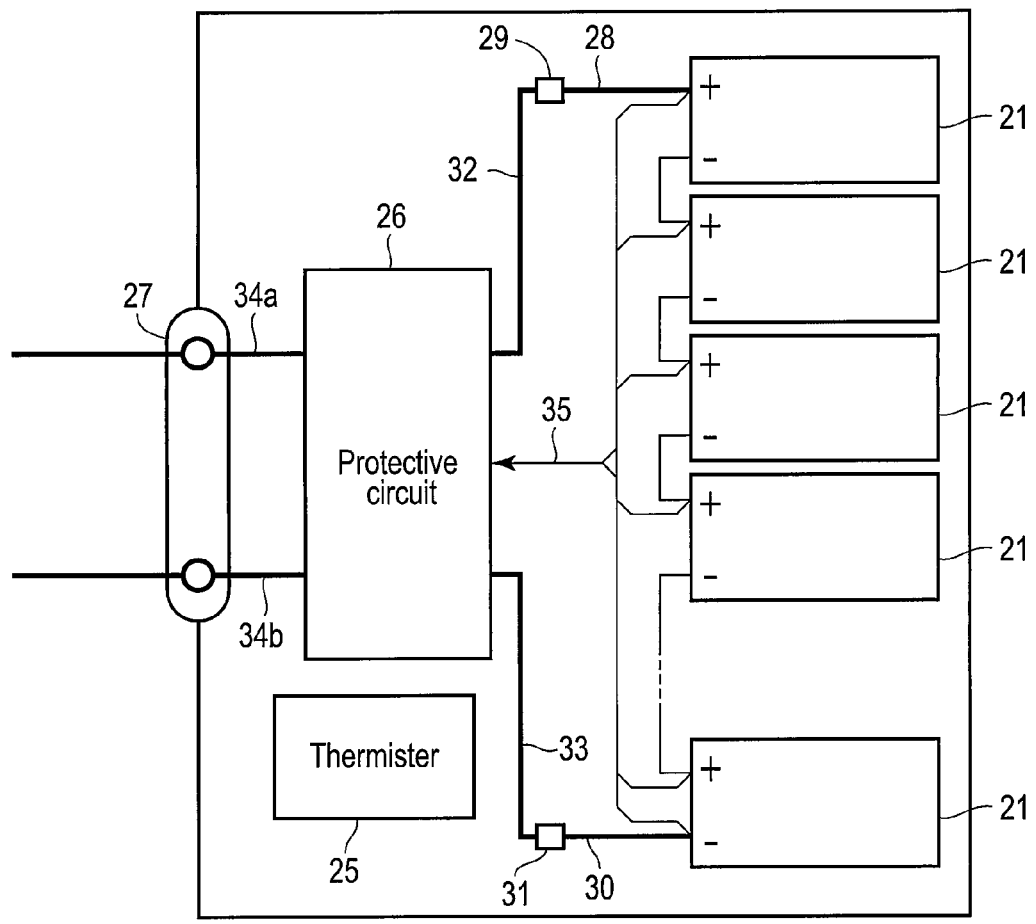
F I G. 4

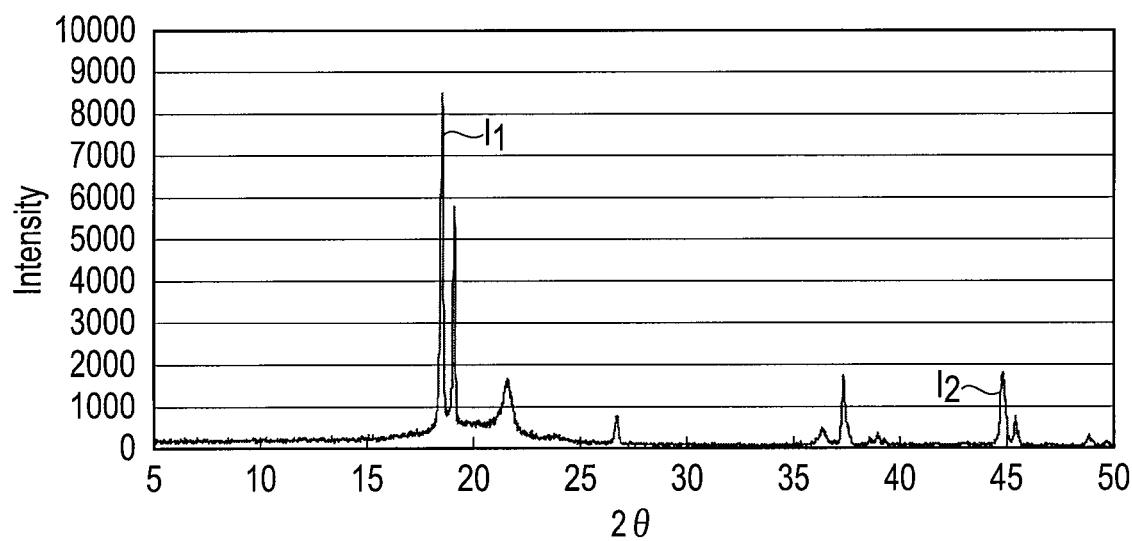
F I G. 9

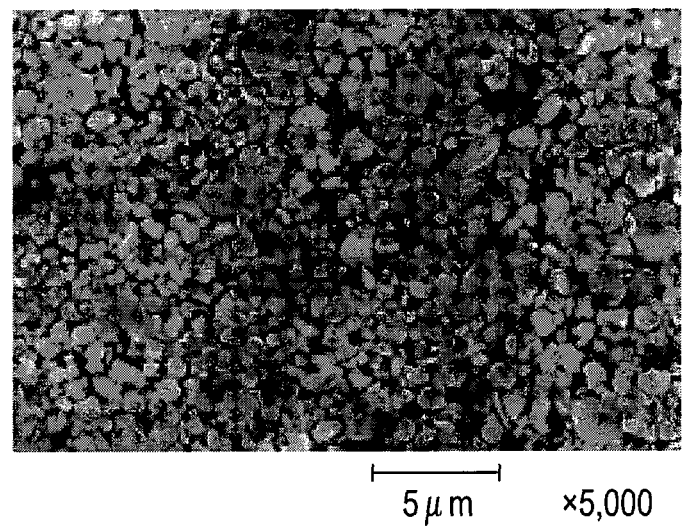
F I G. 12

POSITIVE ELECTRODE, NONAQUEOUS ELECTROLYTE BATTERY AND BATTERY PACK

CROSS-REFERENCE TO RELATED APPLICATIONS

This is a Continuation Application of PCT Application No. PCT/JP2012/053842, filed Feb. 17, 2012, and is based upon and claims the benefit of priority from prior Japanese Patent Application No. 2011-033442, filed Feb. 18, 2011, the entire contents of all of which are incorporated herein by reference.

FIELD

Embodiments relate to a positive electrode, a nonaqueous electrolyte battery and a battery pack.

BACKGROUND

Electrodes of nonaqueous electrolyte batteries including nonaqueous electrolyte secondary batteries are produced, for example, by adding an electron conductive substance and a binder to an active material, and suspending the mixture in a suitable solvent, applying this suspension (slurry) to a current collector, and performing drying and pressing. It is known that the orientation of the electrode active material on the surface of the electrode varies depending on the dispersion conditions in the suspension production step, coating conditions of the suspension, and conditions of the subsequent pressing in this electrode production, and this orientation exerts great influence to battery properties.

BRIEF DESCRIPTION OF THE DRAWINGS

FIG. 3 is an exploded perspective view showing a battery pack according to the embodiment;

FIG. 4 is a block diagram showing a electric circuit of the battery pack of FIG. 3;

FIG. 9 is a chart showing an X-ray diffraction pattern of the positive electrode of Example 1;

FIG. 12 is a view showing a scanning electron micrograph of a positive electrode of Comparative Example 2.

DETAILED DESCRIPTION

Figure 1:
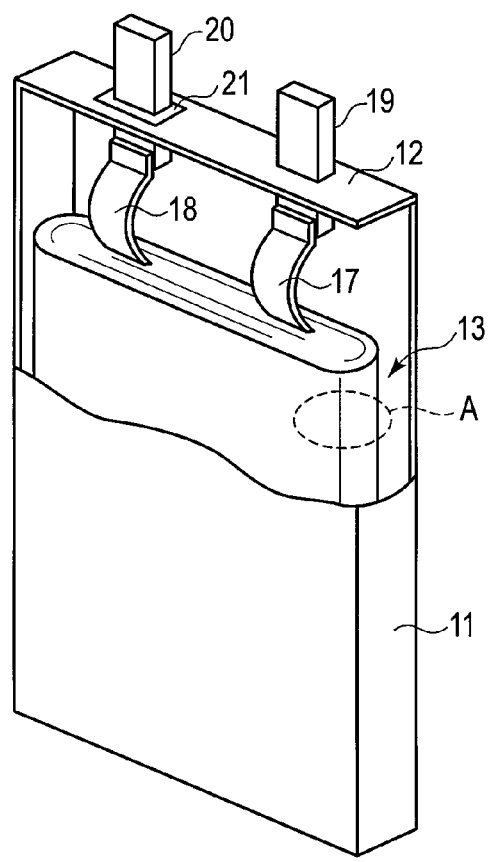
FIG. 1 is a partially cut perspective view showing a nonaqueous electrolyte battery according to the embodiment.

The embodiments will be explained below, referring to drawings.

(First Embodiment)

According to the embodiment, there is provided a positive electrode including a positive electrode material layer including a positive electrode active material, a positive electrode current collector having a positive electrode material layer(s) formed on its one surface or both surfaces. The positive electrode active material has a composition represented by the following formula (1):

$$Li_xNi_{1-a-b}Co_aM_bO_2 \qquad (1)$$

In the formula (1), M is at least one element selected from the group consisting of Mg, Al, Mn, Si, Ti, Zn, Zr, Ca and Sn; x, a and b satisfy $0.9 < x \leq 1.25$, $0 < a \leq 0.4$, and $0 \leq b \leq 0.45$.

The positive electrode material layer satisfies the following formula (2):

$$35 \leq S1/V1 \leq 70 \qquad (2)$$

In the formula (2), S1 is a pore specific surface area of the positive electrode material layer, obtained by a pore distribution measurement according to a mercury porosimetry, and V1 is a pore volume obtained by the pore distribution measurement.

The positive electrode active material having the composition represented by the formula (1) (hereinafter referred to as "first positive electrode active material) is one kind of layered lithium complex oxides. The first positive electrode active material has a higher energy density than that of $LiCoO_2$, which is used in a positive electrode active material for a usual lithium ion secondary battery, and higher safety (thermal stability) than that of $LiNiO_2$, and therefore a useful positive electrode active material. The shape of the first positive electrode active material can be controlled by a starting material powder or calcination conditions. For that reason, the first positive electrode active material includes lithium oxide in the state of a secondary particle, formed by agglomeration of fine primary particles. As a result of a painstaking study by the present inventors, it has been found that in a case of use of a lithium oxide having secondary particles formed by agglomeration of fine primary particles, when agglomerates of primary particles are split into primary particles and they are uniformly dispersed independently in a positive electrode, battery resistance is remarkably increased upon repeated charge-discharge cycles. The present inventors have also found that when the agglomerates of primary particles are split to some extent, and independent primary particles and agglomerates of primary particles are dispersed ununiformly in a positive electrode, the rise in battery resistance is decreased upon repeated charge-discharge cycles, and a capacity degradation of a battery can be reduced.

A positive electrode including a positive electrode active material with a high energy density and capable of reducing resistance increase and capacity degradation of a battery upon repeated charge-discharge cycles includes the first positive electrode active material, and it can be obtained by using the positive electrode material layer satisfying the formula (2) and including the first positive electrode active material. The reason will be explained below. When the value of S1/V1 is less than 35, the rise in battery resistance, accompanied by the charge-discharge cycles, can be inhibited, but the active material includes mostly the agglomerates of primary particle. As ununiformity of current distribution occurs in such a positive electrode, an active material partially inactivated is generated, and capacity degradation occurs. On the other hand, when the value of S1/V1 is more than 70, primary particles hardly agglomerate, and many primary particles exist independently. As a surface area of the active material is large in such a positive electrode, a side reaction weight between the non-aqueous electrolyte and active material surface is increased, and battery resistance, accompanied by charge-discharge cycles, is increased. When the value of S1/V1 is 35 or more and 70 or less, the independent primary particles and the agglomerates of primary particles can be in an optimal coexistence state, and therefore the disproportionation of current distribution can be avoided, and the side reaction between the nonaqueous electrolyte and the active material surface can be inhibited. This can inhibit the resistance increase and the capacity degradation, accompanied by the charge-discharge cycles, while the positive electrode active material having a high energy density is used. The value of S1/V1 is preferably in a range of 36 or more and 50 or less.

The positive electrode desirably satisfies the following formula (3):

$$0.12 \leq I_2/I_1 \leq 0.24 \qquad (3)$$

wherein $I_1$ is an intensity of a main peak appearing in a range of 2θ of 16° or more and 21° or less in an X-ray diffraction pattern using CuKα as a radiation source on a surface of the positive electrode material layer; and $I_2$ is an intensity of a main peak appearing in a range of 2θ of 42° or more and 47° or less in the X-ray diffraction pattern described above.

When the value of $(I_2/I_1)$ is 0.24 or less, an orientation of the active material in the positive electrode can be increased, and therefore variation in current distribution can be reduced. When the value of $(I_2/I_1)$ is 0.12 or more, a resistance of the positive electrode can be reduced. The reason why the resistance of the positive electrode is reduced when the value of $(I_2/I_1)$ is 0.12 or more can be assumed to be a inhibition of a remarkable increase of a density of a positive electrode material layer which is located far from the current collector when the positive electrode is viewed in its thickness direction, compared to a density of a positive electrode material layer which is located near the current collector, and binding property of an interface between the positive electrode material layer and the current collector is satisfactory. When the value of $(I_2/I_1)$ is 0.12 or more and 0.24 or less, therefore, the variation of the current distribution and the resistance of the positive electrode can be reduced; as a result, an effect of inhibiting the resistance increase and the capacity degradation with the passing of each cycle can be increased. The value of $(I_2/I_1)$ is preferably in a range of 0.15 or more and 0.22 or less.

Preferably, the first positive electrode active material has a pore volume V2 of 0.3 cm$^3$/g or more and 0.75 cm$^3$/g or less, obtained by the pore distribution measurement according to the mercury porosimetry. When V2 is made smaller, the number of the secondary particles formed by the agglomeration of the primary particles is increased in the positive electrode, and when V2 is made larger, the number of the independent primary particles is increased in the positive electrode. When V2 is 0.3 cm$^3$/g or more and 0.75 cm$^3$/g or less, a abundance ratio of the secondary particles and the independent primary particles, which do not form the secondary particle, can be further optimized; as a result, the effect of inhibiting the resistance increase and the capacity degradation with the passing of each cycle can be further increased. The value of V2 is preferably in a range of 0.4 to 0.6 cm$^3$/g.

Preferably, the first positive electrode active material has a mode diameter of the pore distribution obtained by the mercury porosimetry of in a range of 1 μm or more and 10 μm or less, and a pore volume in a range of 0.005 cm$^3$/g or more and 0.1 cm$^3$/g or less at a peak appearing in a range of a pore size of 0.01 to 0.5 μm in the pore distribution. The mode diameter is a diameter of a pore at the maximum pore volume in a pore distribution curve. When the mode diameter is 1 μm or more, the side reaction with the nonaqueous electrolyte can be inhibited. On the other hand, when the mode diameter is 10 μm or less, a resistance in lithium ion diffusion can be reduced in the active material. When the mode diameter is adjusted to a range of 1 μm or more and 10 μm or less, therefore, the side reaction with the nonaqueous electrolyte and the resistance in lithium ion diffusion can be inhibited. The larger the pore volume at the peak appearing within a range of a pore size of 0.01 to 0.5 μm, the larger the amount of the positive electrode active material in the state of a fine powder. When the pore volume is controlled to a range of 0.005 cm$^3$/g or more and 0.1 cm$^3$/g or less, the amount of the positive electrode active material in the state of a fine powder can be adjusted to a suitable range, and therefore the active materials can be satisfactorily brought into contact with each other, while the side reaction between the fine powder of the positive electrode active material and the nonaqueous electrolyte is inhibited. In addition, the resistance in positive electrode can also be decreased.

As stated above, when the mode diameter is adjusted to a range of 1 μm or more and 10 μm or less, and the pore volume is adjusted to a range of 0.005 cm$^3$/g or more and 0.1 cm$^3$/g or less at a peak appearing in a range of a pore size of 0.01 to 0.5 μm, the effect of inhibiting the resistance increase and the capacity degradation with the passing of each cycle can be further increased. The pore volume is more preferably in a range of 0.01 cm$^3$/g or more and 0.1 cm$^3$/g or less. The mode diameter is more preferably in a range of 1.5 μm or more and 7 μm or less.

In the first positive electrode active material, a pore specific surface area S2 obtained by the pore distribution measurement according to the mercury porosimetry is not particularly limited, and it is preferably in a range of 0.5 m$^2$/g or more and 1.4 m$^2$/g or less. When S2 is adjusted to 0.5 m$^2$/g or more, the resistance increase in the positive electrode can be inhibited. When S2 is adjusted to 1.4 m$^2$/g or less, the side reaction with the nonaqueous electrolyte can be inhibited. When S2 is adjusted to a range of 0.5 m$^2$/g or more and 1.4 m$^2$/g or less, therefore, the resistance increase in the positive electrode can be reduced and the side reaction with the nonaqueous electrolyte can be inhibited, whereby the effect of inhibiting the resistance increase and the capacity degradation with the passing of each cycle can be further increased. S2 is more preferably in a range of 0.7 or more and 1.2 or less.

A measurement procedure of the pore distribution according to the mercury porosimetry in each of the positive electrode material layer and the positive electrode active material will be explained. The measurement conditions are: an initial pressure is 20 kPa (about 3 psia, corresponding to a pore size of about 60 μm); and a terminal pressure is 414 MPa (about 60000 psia, corresponding to a pore size of 0.003 μm). When the positive electrode material layer in the positive electrode, taken out from a battery by disassembly thereof, is subjected to measurement, the positive electrode, taken out from the battery by the disassembly thereof, is cut into a rectangle with a width of about 25 mm, the rectangle is housed in a cell for measurement, and the measurement is performed. The pore distribution is a pore distribution obtained by measurement under an initial pressure of 20 kPa and a terminal pressure of 414 MPa. S1 and S2 are pore specific surface areas obtained by this pore distribution, and V1 and V2 are pore volumes obtained by this pore distribution. As the pore volume, a value per unit weight is used. The pore volume and the pore specific surface area of the positive electrode material layer are calculated using a net weight of the positive electrode material layer, which is obtained by subtracting the weight of the current collector (for example, an aluminum foil). The pore specific surface area is calculated supposing that the shape of the pore is a cylinder. The term "peak appearing in a range of a pore size of 0.01 to 0.5 pm" refers to the maximum pore volume in a range of a pore size of 0.01 to 0.5 μm.

A method for measuring an X-ray diffraction pattern using CuKa as a radiation source, for obtaining an intensity ratio ($I_2/I_1$) will be explained below. The measurement method of the X-ray diffraction pattern is not particularly limited. For example, when a Rotor flux type X-ray radiation source is used, the measurement is performed under conditions of a θ/2θ continuous measurement, an accelerating voltage of 40 kV, an accelerating current of 100 mA and a scanning speed of 1°/minute.

In the X-ray diffraction pattern measured in the method described above, a main peak appearing in a range of 2θ of 16° or more and 21° or less, or a main peak appearing in a range of 2θ of 42° or more and 47° or less are the maximum intensity in each 2θ range.

When the positive electrode taken out from a battery by the disassembly thereof is subjected to the X-ray difractometry described above, the battery is disassembled to take out the positive electrode therefrom in the following method. First, the battery is in a condition of discharge. The state of discharge refers to, for example, a state in which the battery is discharged to reach a recommended minimum voltage. In the discharged battery, the electrode group is taken out from the case under an inert atmosphere (for example, argon atmosphere). The electrode group is disassembled to take out the positive electrode alone, and the taken positive electrode is cut into a suitable size so that it is fitted to a glass plate used in the X-ray diffraction pattern measurement. The cut positive electrode is washed in a methyl ethyl carbonate solvent to dissolve an Li salt in the positive electrode, and the washed positive electrode is dried under a reduced pressure, whereby the solvent is removed from the positive electrode. The dried positive electrode is fixed on a glass plate for measurement, and then the X-ray difractometry is performed.

The positive electrode active material may include the first positive electrode active material alone or may include materials other than the above. The positive electrode active material other than the first positive electrode active material (hereinafter referred to as a second positive electrode active material) may include, for example, manganese dioxide ($MnO_2$), iron oxide, copper oxide, nickel oxide, $Li_aMnO_2$ (0<a≤1.2), lithium cobalt complex oxides ($Li_aCoM_hO_2$ wherein M is at least one element selected from the group consisting of Al, Cr, Mg and Fe, 0<a≤1.2, and 0≤h≤0.1), lithium manganese cobalt complex oxides {for example, $LiMn_{1-g-h}Co_gM_hO_2$ wherein M is at least one element selected from the group consisting of Al, Cr, Mg and Fe, 0≤h≤0.1 and 0≤g≤0.5)}, lithium manganese nickel complex oxides {for example, $LiMn_jNi_jM_{1-2j}O_2$ wherein M is at least one element selected from the group consisting of Co, Cr, Al, Mg and Fe, ⅓≤j≤½), $LiMn_{1/3}Ni_{1/3}Co_{1/3}O_2$, or $LiMn_{1/2}Ni_{1/2}O_2$}, spinel type lithium manganese complex oxides (for example, $Li_aMn_{2-b}M_bO_4$ wherein M is at least one element selected from the group consisting of Al, Cr, Ni and Fe, 0<a≤1.2, and 0≤b≤1), spinel type lithium manganese nickel complex oxides {for example, $Li_aMn_{2-b}NibO4$ wherein 0<a≤1.2, and 0≤b≤1)}, lithium phosphorus oxides having an olivine structure {for example, $Li_aFePO_4$, $Li_aFe_{1-b}Mn_bPO_4$, $Li_aCoPO_4$, and the like (0<a≤1.2, and 0≤b≤1)}, iron sulfate ($Fe_2(SO_4)_3$), and vanadium oxide (for example, $V_2O_5$). The second positive electrode active material may also include conductive polymer materials such as polyaniline and polypyrrole, and organic materials and inorganic materials such as disulfide polymer materials, sulfur (S) and fluorinated carbon.

Preferable examples of the second positive electrode active material may include lithium cobalt complex oxides, lithium manganese nickel complex oxides, spinel type lithium manganese complex oxides, spinel type lithium manganese nickel complex oxides, lithium manganese cobalt complex oxides and lithium iron phosphate.

The positive electrode active material has desirably an average particle size of 1 μm or more and 30 μm or less. A more preferable range is from 1 μm to 15 μm.

When a binder is added to the positive electrode material layer, for example, polytetrafluoroethylene (PTFE), poly(vinylidene fluoride) (PVdF), and fluorine-containing rubber may be used as the binder.

The positive electrode material layer may include an electron conductive substance. Examples of the electron conductive substance may include carbonaceous materials such as acetylene black, carbon black and graphite.

As for a mixing ratio of the positive electrode active material, the electron conductive substance and the binder, it is preferable that the ratio of the positive electrode active material is from 73 to 95% by weight, the ratio of the electron conductive substance is from 3 to 20% by weight and the ratio of the binder is from 2 to 7% by weight.

The positive electrode current collector is desirably formed from an aluminum foil or aluminum alloy foil. The aluminum foil and the aluminum alloy foil have an average crystal grain size of preferably 50 μm or less, more preferably 30 μm or less, further more preferably 5 μm or less. When the average crystal grain size is 50 μm or less, the intensity of the aluminum foil or aluminum alloy foil can be dramatically increased, and the positive electrode can be pressed at a high pressure to get a high density, and the battery capacity can be increased.

The average crystal grain size can be obtained as follows: The surface structure of the current collector is observed with an optical microscope, and the number n of crystal grains existing in an area of 1 mm×1 mm is counted. An average crystal grain area S is obtained from an equation: $S=1\times10^6/n$ (μm$^2$) using the number n. The average crystal grain size d (μm) is calculated from the following equation (A) using the obtained value S.

$$d=2(S/\pi)^{1/2} \quad (A)$$

The average crystal grain sizes of the aluminum foil and the aluminum alloy foil vary by complex influences due to multiple factors such as a structure of the material, impurities, processing conditions, a heat treatment history and annealing conditions. The crystal grain size can be controlled by combination of the factors described above in the production step of the current collector.

The aluminum foil and the aluminum alloy foil have a thickness of 20 μm or less, more preferably 15 μm or less. The aluminum foil has preferably a purity of 99% by mass or more. Examples of the aluminum alloy may preferably include alloy including an element such as magnesium, zinc and silicon. On the other hand, it is preferable to adjust a content of a transition metal such as iron, copper, nickel or chromium to 1% by mass or less.

The positive electrode is produced, for example, by adding the electron conductive substance and the binder to the first positive electrode active material, dispersing the mixture in a suitable solvent, applying the resulting suspension (slurry) to the current collector, and drying and pressing it to form into a strip-shaped electrode.

The pore distribution state and the intensity ratio represented by the formula (2) of the positive electrode material layer can be controlled by, for example, a dry blending condition of the active material in the electrode production, a dispersing condition in the suspension preparation, a coating condition of the suspension, a condition in the subsequent pressing, and the like. The dry blending condition of the active material and the dispersing condition in the suspension preparation are important for the pore distribution state. When the dispersion condition is too strong, an electrode having the primary particles alone is obtained. On the other hand, when the dispersion condition is too weak, an electrode having many secondary particles formed by agglomeration of the primary particles is obtained. Examples of the dispersion technique on preparation of an appropriate suspension may include a dispersion in which the active material is pulverized using an automatic mortar, a hammer mill or a jet mill, and then a mill dispersion in which beads having a diameter of 0.5 mm or smaller are used. The dispersion technique using beads with a small bead size is suitably used for dispersion of a material having a small particle size, but is not suitably applied to a dispersion of a powder of particles with a particle size of 1 μm or larger due to an insufficient cracking power. The inventors have found that it is preferable to disperse the positive electrode active material, which has been dry blended to be pulverized or to be subjected to damage, at a condition of small cracking power. It is not preferable to pulverize the active material alone upon the dry blending, because of excessive advance of pulverization. It is preferable, therefore, to mix it with other particles such as the electron conductive substance and dry blend the mixture, in which the electron conductive substance exhibits an effect that a buffer exhibits, whereby the excessive advance of pulverization can be inhibited. The condition in the pressing step is important for the control of the intensity. A ratio of peak intensity obtained from an X-ray difractometry varies depending on the pressing condition even if electrode densities are constant, though details have not been clear.

The first embodiment described above can provide the positive electrode capable of realizing a nonaqueous electrolyte battery having a large energy density, and a small rise in resistance and a small drop in capacity on the charge-discharge cycles.

(Second Embodiment)

The second embodiment provides a nonaqueous electrolyte battery having a positive electrode according to the first embodiment, a negative electrode, and a nonaqueous electrolyte. The nonaqueous electrolyte battery further may include a separator provided between the positive electrode and the negative electrode, and a case.

The negative electrode, the nonaqueous electrolyte, the separator and the case will be explained in detail below.

1) Negative Electrode

This negative electrode has a current collector, and a negative electrode material layer which is formed on one surface or both surfaces of the current collector and include a negative electrode active material, an electron conductive substance and a binder. This negative electrode is produced, for example, by adding the electron conductive substance and the binder to the powdery negative electrode active material, dispersing the mixture in a suitable solvent, applying the resulting suspension (slurry) to the current collector, and drying and pressing it to form into a strip-like electrode.

As the current collector, for example, a copper foil, an aluminum foil or an aluminum alloy foil may be used. The aluminum foil or the aluminum alloy foil forming the current collector has an average crystal grain size of desirably 50 μm or less, more preferably 30 μm or less, further more preferably 5 μm or less.

The average crystal grain size can be obtained in the method described above. When the average crystal grain size of the aluminum foil or the aluminum alloy foil is 50 μm or less, the intensity of the aluminum foil or the aluminum alloy foil can be dramatically increased. Consequently, the pressure can be increased upon the pressing to get a negative electrode material layer having a high density, whereby a negative electrode capacity can be increased. In addition, solution and corrosion degradation of the current collector can be prevented in over discharge cycles under a high temperature atmosphere (40° C. or higher). Consequently, the rise in impedance of the negative electrode can be inhibited. Furthermore, output characteristics, fast charge, and charge-discharge cycle properties can be improved.

The average crystal grain size of the aluminum foil or the aluminum alloy foil vary by complex influences due to multiple factors such as a structure of the material, impurities, processing conditions, a heat treatment history and annealing conditions. The crystal grain size can be controlled by combination of the factors described above in the production step of the current collector.

The aluminum foil or the aluminum alloy foil has a thickness of desirably 20 μm or less, more preferably 15 μm or less. The aluminum foil has preferably a purity of 99% by mass or more. Preferable aluminum alloy is alloy including an element such as magnesium, zinc or silicon. A content of a transition metal such as iron, copper, nickel or chromium, which is included as an alloy component, is preferably adjusted to 1% by mass or less.

Examples of the negative electrode active material may include lithium titanium complex oxides. Examples of the lithium titanium complex oxide may include a spinel type lithium titanate represented by the formula: $Li_{4+x}Ti_5O_{12}$ wherein x varies within a range of $-1 \leq x \leq 3$ depending on the charge and discharge reaction; ramsdellite type lithium titanate represented by $Li_{2+x}Ti_3O_7$ wherein x varies within a range of $-1 \leq x \leq 3$ depending on the charge and discharge reaction; and metal complex oxides including Ti and at least one element selected from the group consisting of P, V, Sn, Cu, Ni and Fe. Examples of the metal complex oxides including Ti and at least one element selected from the group consisting of P, V, Sn, Cu, Ni and Fe may include $TiO_2$—$P_2O_5$, $TiO_2$—$V_2O_5$, $TiO_2$—$P_2O_5$—$SnO_2$, and $TiO_2$—$P_2O_5$—MeO in which Me is at least one element selected from the group consisting of Cu, Ni and Fe. Preferably, this metal complex oxide has a low crystallinity and is in the state of a microstructure in which crystal phases coexist with amorphous phases, or amorphous phases exist alone. The metal complex oxide having such a microstructure can remarkably improve the cycle characteristics. Lithium is introduced into the metal complex oxide by charge, thereby changing it into a lithium titanium complex oxide. Of the lithium titanium complex oxides, spinel type lithium titanate is preferable because of its excellent cycle characteristics.

Example of the other negative electrode active material may include carbonaceous materials and metal compounds.

Examples of the carbonaceous material may include natural graphite, artificial graphite, coke, vapor phase growth carbon fiber, mesophase pitch carbon fiber, spherical carbon, and resin-calcined carbon. More preferable carbonaceous material may include the vapor phase growth carbon fiber, the mesophase pitch carbon fiber and the spherical carbon. The carbonaceous material has preferably a spacing of (002) plane, $d_{002}$ of 0.34 nm or less, according to an X-ray diffraction.

Metal sulfides and metal nitrides may be used as the metal compound. As the metal sulfide, titanium sulfides such as $TiS_2$, molybdenum sulfides such as $MoS_2$, iron sulfides such as FeS, $FeS_2$, and $Li_xFeS_2$ may be used. As the metal nitride, for example, lithium cobalt nitrides (for example, $Li_sCo_tN$, $0<s<4$, $0<t<0.5$) may be used.

Examples of the binder may include polytetrafluoroethylene (PTFE), poly(vinylidene fluoride) (PVdF), fluorine-containing rubber, styrene-butadiene rubber, and the like.

As for a mixing ratio of the negative electrode active material, the electron conductive substance and the binder, it is preferable that the ratio of the negative electrode active material is from 73 to 96% by weight, the ratio of the electron conductive substance is from 2 to 20% by weight, and the ratio of the binder is from 2 to 7% by weight.

2) Nonaqueous Electrolyte

The nonaqueous electrolyte includes a nonaqueous solvent and an electrolyte salt dissolved in the nonaqueous solvent. The nonaqueous electrolyte may include a polymer.

As the electrolyte salt, lithium salts including, for example, $LiPF_6$, $LiBF_4$, $Li(CF_3SO_2)_2N$ (bistrifluoromethanesulfonyl amide lithium; commonly called "LiTFSI"), $LiCF_3SO_3$ (commonly called "LiTFS"), $Li(C_2F_5SO_2)_2N$ (bispentafluoroethanesulfonyl amide lithium; commonly called "LiBETI"), $LiClO_4$, $LiAsF_6$, $LiSbF_6$, lithium bisoxalato borate $\{LiB(C_2O_4)_2$; commonly called "LiBOB"$\}$, difluoro (trifluoro-2-oxide-2-trifluoro-methylpropionate(2-)-0,0) lithium borate $\{LiBF_2OCOOC(CF_3)_2$; commonly called "$LiBF_2(HHIB)$"$\}$ may be used. These electrolyte salts may be used alone or as a mixture of two kinds or more. Preferable electrolyte salt includes $LiPF_6$ and $LiBF_4$.

The concentration of the electrolyte salt is preferably from 1 to 3 mole/L. Such a definition of the electrolyte concentration can improve the efficiency when a high load current is flown, while the influence of viscosity increase due to the increased electrolyte salt concentration is inhibited.

The nonaqueous solvent is not particularly limited, and propylene carbonate (PC), ethylene carbonate (EC), 1,2-dimethoxyethane (DME), γ-butyrolactone, (GBL), tetrahydrofuran (THF), 2-methyltetrahydrofuran (2-MeHF), 1,3-dioxolane, sulfolane, acetonitrile (AN), diethyl carbonate (DEC), dimethyl carbonate (DMC), methyl ethyl carbonate (MEC) or dipropyl carbonate (DPC) may be used. These solvents may be used alone or as a mixture of two kinds of more.

An additive may be added to the nonaqueous electrolyte. The additive is not particularly limited, and examples thereof may include vinylene carbonate (VC), vinylene acetate (VA), vinylene butylate, vinylene hexanate, vinylene crotonate, catechol carbonate, ethylene sulfite, propylene sulfite, 1,3-propene sultone, propane sultone, 1,4-butylene sultone, sulfolane, phenyl ethyl carbonate, and the like. The additives may be used alone, or as a mixture of two kinds of more. The concentration of the additive is preferably from 0.1% by weight to 3% by weight, based on 100% by weight of the nonaqueous electrolyte, and more preferably 0.5% by weight or more and 1% by weight or less, based on 100% by weight of the nonaqueous electrolyte.

3) Separator

The separator is not particularly limited so long as it has electric insulation property. A porous film or unwoven fabric produced from a polymer such as a polyolefin, cellulose, polyethylene terephthalate or vinylon may be used. The materials for the separator may be used alone or as a mixture of two kinds or more.

The first positive electrode active material includes a remaining alkali component including LiOH and $Li_2CO_3$. The elution of the remaining alkali component into the nonaqueous electrolyte is promoted when the first positive electrode active material has a small amount of the agglomerates of the primary particle, and the primary particles are uniformly dispersed in the positive electrode. When the remaining alkali component elutes into the nonaqueous electrolyte, the alkali component is reacted with the separator, resulting in increase of the battery resistance. For that reason, it is preferable to use a high alkali resistant material for the separator. Examples of the high alkali resistant separator material may include cellulose, polyethylene terephthalate and vinylon. Of these, the cellulose is preferable.

4) Case

As the case, a container produced from a laminate film having a thickness of 0.5 mm or less, or a metal having a thickness of 1 mm or less is used. The metal container has preferably a thickness of 0.5 mm or less.

Examples of the shape of the case, that is, the battery shape may include flat type (thin type), rectangular type, cylindrical type, coin type, button type, and the like. The battery can be used in either compact applications in which it is loaded in, for example, portable electronic devices, or large applications in which it is loaded in vehicles including bicycles to four-wheeled vehicles.

As the laminate film, a multi-layered films including a metal layer between resin layers. The metal layer is preferably formed from an aluminum foil or an aluminum alloy foil, because of weight saving. The resin layer may be formed using, for example, a polymer material such as polypropylene (PP), polyethylene (PE), nylone and polyethylene terephthalate (PET). The laminate film can be heat-sealed to form into the case.

The metal container is formed from aluminum or aluminum alloy. Alloy including an element such as magnesium, zinc or silicon is preferable as the aluminum alloy. When the alloy includes a transition metal such as iron, copper, nickel or chromium, the content thereof is preferably controlled to 100 ppm or less.

Figure 2:
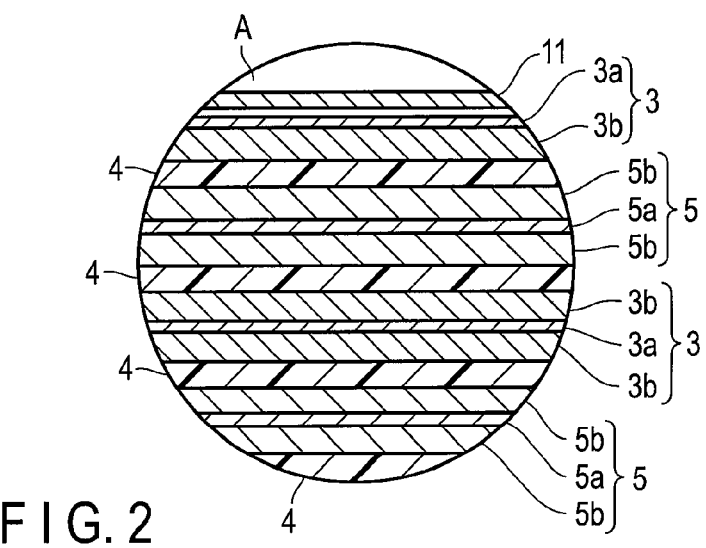
FIG. 2 is an enlarged sectional view showing A part in FIG. 1.

Next, the nonaqueous electrolyte battery according to the second embodiment will be explained in detail, referring to FIG. 1 and FIG. 2. FIG. 1 is a partially cut perspective view showing a rectangular nonaqueous electrolyte battery, and FIG. 2 is an enlarged sectional view of A part in FIG. 1. Each figure is a schematic view in order to promote explanation of the embodiment and understanding thereof, and there are some parts in shapes and dimensions differing from those in actual devices, and their designs may be suitably changed, considering the explanations described below and known technologies.

In the rectangular nonaqueous electrolyte battery shown in FIG. 1, a wound electrode group 13 is housed in a metal rectangular cylindrical container 11 having a bottom (case).

The flat, wound electrode group 13 is formed, as shown in FIG. 2, in procedures in which a negative electrode 3, a separator 4, a positive electrode 5 and a separator 4 are laminated in this order from the outside to form a laminate, then the laminate is spirally wound, and the resulting product is subjected to press-molding.

A negative electrode tab 18 is electrically connected at one end to a negative electrode current collector 3a, and at the other end to a negative electrode terminal 20. The negative electrode terminal 20 is fixed to a rectangular lid 12 through a negative electrode gasket 21. A positive electrode tab 17 is electrically connected at one end to a positive electrode current collector 5a, and at the other end to a positive electrode terminal 19 fixed to the rectangular lid 12.

A nonaqueous electrolytic solution (liquid nonaqueous electrolyte) is, for example, injected from an opening of the container 11 and housed in the container 11. The wound electrode group 13 and the nonaqueous electrolytic solution are sealed in the container 11 by welding the rectangular lid 12 on the opening of the container 11.

The negative electrode tab 18 is made from a material, for example, aluminum or aluminum alloy including an element such as Mg, Ti, Zn, Mn, Fe, Cu or Si. The negative electrode tab 18 is preferably made from the same material as that of the negative electrode current collector in order to reduce the contact resistance with the negative electrode current collector.

The positive electrode tab 17 is made from a material, for example, aluminum or aluminum alloy including an element such as Mg, Ti, Zn, Mn, Fe, Cu or Si. The positive electrode tab 17 is preferably made from the same material as that in the positive electrode current collector in order to reduce the contact resistance with the positive electrode current collector.

According to the second embodiment described above, the nonaqueous electrolyte battery having a large energy density, and small rise in resistance and capacity degradation on the charge-discharge cycles can be realized.

(Third Embodiment)

A battery pack according to a third embodiment includes as at least one unit cell one or more nonaqueous electrolyte battery of the second embodiment. When the pack includes multiple unit cells, the unit cells are electrically connected in series or in parallel to each other.

Such a battery pack will be explained in detail, referring to FIG. 3 and FIG. 4. As the unit cell, for example, a flat-type battery may be used.

Multiple unit cells 21, formed from flat-type nonaqueous electrolyte batteries, are laminated so that a negative electrode terminal 6 and a positive electrode terminal 7, which extend outward, are arranged in the same direction, and they are fastened with an adhesive tape 22 to form a battery module 23. These unit cells 21 are electrically connected in series to each other, as shown in FIG. 4.

A printed wiring board 24 is located so that it faces side faces of the unit cell 21 from which the negative electrode terminal 6 and the positive electrode terminal 7 extend. As shown in FIG. 4, a thermister 25, a protective circuit 26 and a terminal 27 for passing current to external devices are mounted on the printed wiring board 24. An insulating plate (not shown) is attached to a side face of the protective circuit board 24 facing the battery module 23, in order to avoid unnecessary connect with wirings of the battery module 23.

A positive electrode lead 28 is connected to the positive electrode terminal 7 positioned in the undermost layer of the battery module 23, and its tip is inserted into a positive electrode connector 29 of the printed wiring board 24 to electrically connect it. A negative electrode lead 30 is connected to the negative electrode terminal 6 positioned in the uppermost layer of the battery module 23, and its tip is inserted into a negative electrode connector 31 of the printed wiring board 24 to electrically connect it. These connectors 29 and 31 are connected to a protective circuit 26 through wirings 32 and 33 formed on the printed wiring board 24.

The thermister 25 detects a temperature of the unit cell 21, and the detection signal thereof is sent to a protective circuit 26. The protective circuit 26 can interrupt a plus wiring 34a and a minus wiring 34b between the protective circuit 26 and the terminal 27 for passing current to external devices at a pre-determined condition. The pre-determined condition may include, for example, a condition in which the detection temperature of the thermister 25 is over a pre-determined temperature. Also, the pre-determined condition may include a condition in which over-charge, over-discharge and over-current of the unit cell 21 are detected. Each of the unit cells 21 and the battery module 23 are subjected to the detection of the over-charge and the like. When each of the unit cells 21 is detected, a battery voltage may be detected, or a positive electrode potential or a negative electrode potential may be detected. In the latter case, a lithium electrode is inserted into each unit cell 21 as a reference electrode. In the cases of FIG. 3 and FIG. 4, wirings 35 are connected to each unit cell 21 for voltage detection, and detection signals are sent to the protective circuit 26 through these wirings 35.

A rubber or resin protective sheet 36 is located on each of three side faces of the battery module 23 except for the side face from which the positive electrode terminal 7 and the negative electrode terminal 6 protrude.

The battery module 23 is housed in a housing container 37 together with the protective sheets 36 and the printed wiring board 24. In other words, protective sheets 36 are located on both of inner surfaces in a long side direction of the housing container 37 and one inner surface in a short side direction of the housing container 37, and the printed wiring board 24 is located on the other inner surface in a short side direction. The battery module 23 is positioned in a space surrounded by the protective sheets 36 and the printed wiring board 24. A lid 38 is attached to a top face of the housing container 37.

For fixing the battery module 23, a thermally-shrinkable tape may be used instead of the adhesive tape 22. In that case, after protective sheets are located at both of side faces of a battery module, it is surrounded by a heat shrink tube, and then the heat shrink tube is thermally shrunk to bind the battery module.

In FIG. 3 and FIG. 4, an embodiment in which the unit cells 21 are connected in series is described, they may be connected in parallel, for increasing a battery capacity. Assembled battery packs may be connected in series or in parallel.

The embodiments of the battery pack may be appropriately altered depending on the application thereof. The application of the battery pack may include applications in which cycle characteristics at high rate are desired. Specifically, the application may include applications as power sources for digital cameras, or for mounting on bicycles to four-wheeled hybrid electric cars, bicycles to four-wheel four-wheeled electric cars, or power-assisted bicycles. Particularly, it is preferably used for mounting on cars.

The third embodiment as described in detail above can provide a battery pack having a large energy density, and small rise in resistance and capacity degradation upon the charge-discharge cycles.

EXAMPLES

Examples will be explained below, but the embodiments are not limited to Examples described below without departing from the scope of the embodiment.

Example 1

<Production of Positive Electrode>

$LiNi_{0.6}Co_{0.2}Mn_{0.2}O_2$ having an average particle size of 5 μm as a first positive electrode active material; $LiCoO_2$ having an average particle size of 5 μm as a second positive electrode active material; graphite and acetylene black as electron conductive substances, and PVdF as a binder were prepared.

Figure 5:
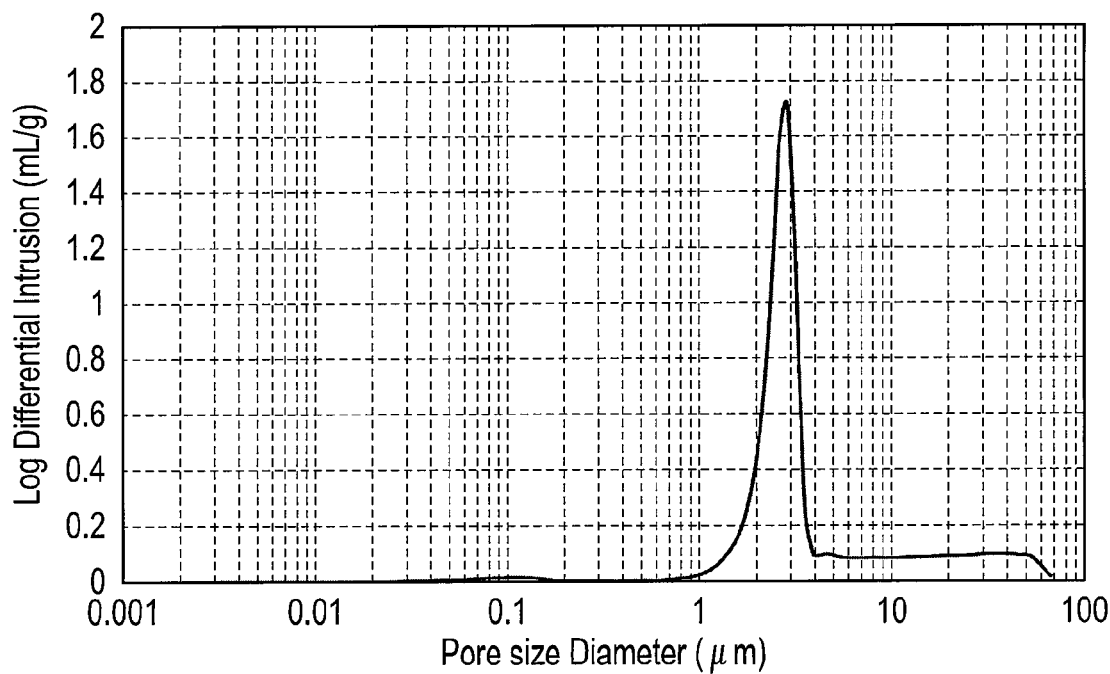
FIG. 5 is a pore distribution chart of a positive electrode active material of Example 1 according to a mercury porosimetry.
Figure 6:
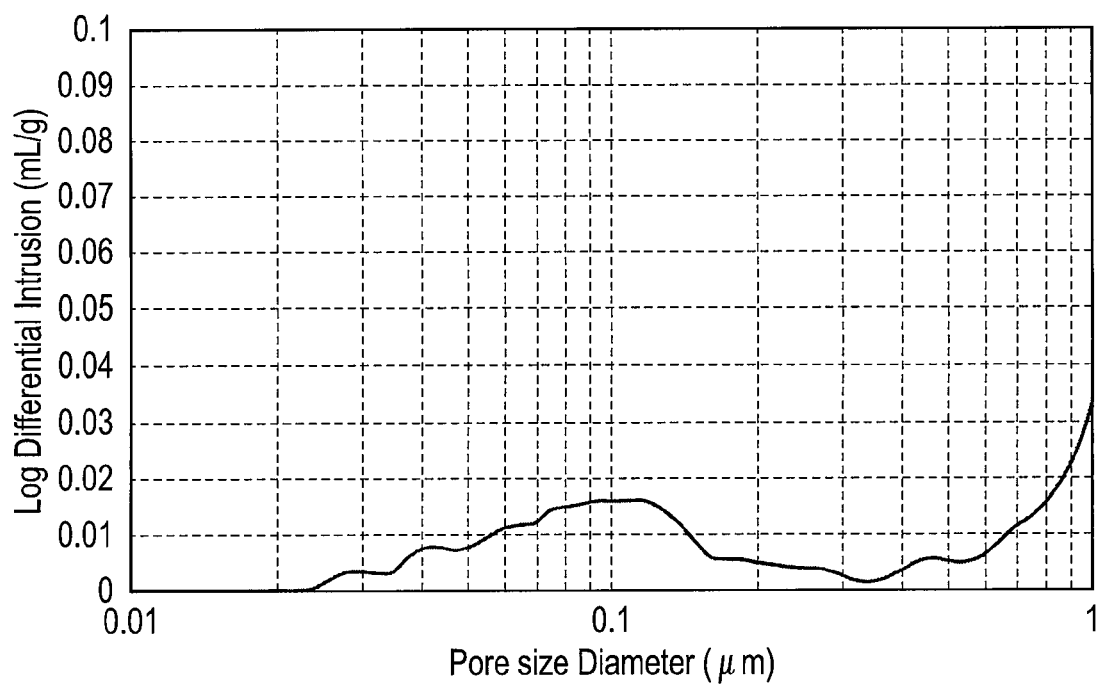
FIG. 6 is a partially enlarged sectional view of the pore distribution of FIG. 5.

The pore distribution of the first positive electrode active material was measured according to the mercury porosimetry using Shimadzu Auto-Pore 9520 as a measuring device. Measurement conditions including an initial pressure and a terminal pressure are as described above. An obtained pore distribution is shown in FIG. 5, and an enlarged views of a pore distribution within a range of a pore diameter of 0.01 to 1 μm in FIG. 5 is shown in FIG. 6. In FIG. 5 and FIG. 6, a horizontal axis shows a pore diameter (Pore size Diameter) and a vertical axis shows a Log Differential Intrusion. A pore volume V2 was 0.4448 $cm^3/g$ and a pore specific surface area S2 was 1.11 $m^2/g$, obtained from the pore distribution shown in FIG. 5. As shown in FIG. 6, a peak appeared in a range of a pore size of 0.01 to 0.5 μm, and a Log Differential Intrusion at the peak was 0.017 $cm^3/g$. In addition, a mode diameter which is a pore size diameter at the maximum Log Differential Intrusion in the pore distribution in FIG. 5 was as shown in Table 1 below.

With 75 parts by weight of the first positive electrode active material were mixed 5 parts by weight of acetylene black and 5 parts by weight of graphite, and the resulting mixture was finely pulverized in an automatic mortar for 10 minutes.

Subsequently, 85 parts by weight of the mixture, 10 parts by weight of $LiCoO_2$ and 5 parts by weight of PVdF were dispersed in an N-methylpyrrolidone (NMP) solvent, and they were stirred in a bead mill using beads having bead size of 0.5 mm at a peripheral speed of 1200 rpm for 30 minutes to prepare slurry. The slurry was applied to both surfaces of an aluminum foil current collector having a thickness of 15 μm, and it was dried and press-molded under conditions of a roll temperature of 60° C. and a line pressure of 35 kN to produce a positive electrode in which positive electrode material layers having a thickness of 50 μm and a density of 3.30 $g/cm^3$ were formed on both surfaces of the current collector.

Using a part of the obtained positive electrode, both of a pore distribution according to the mercury porosimetry and an X-ray diffraction pattern of the positive electrode material layer were measured.

Figure 7:
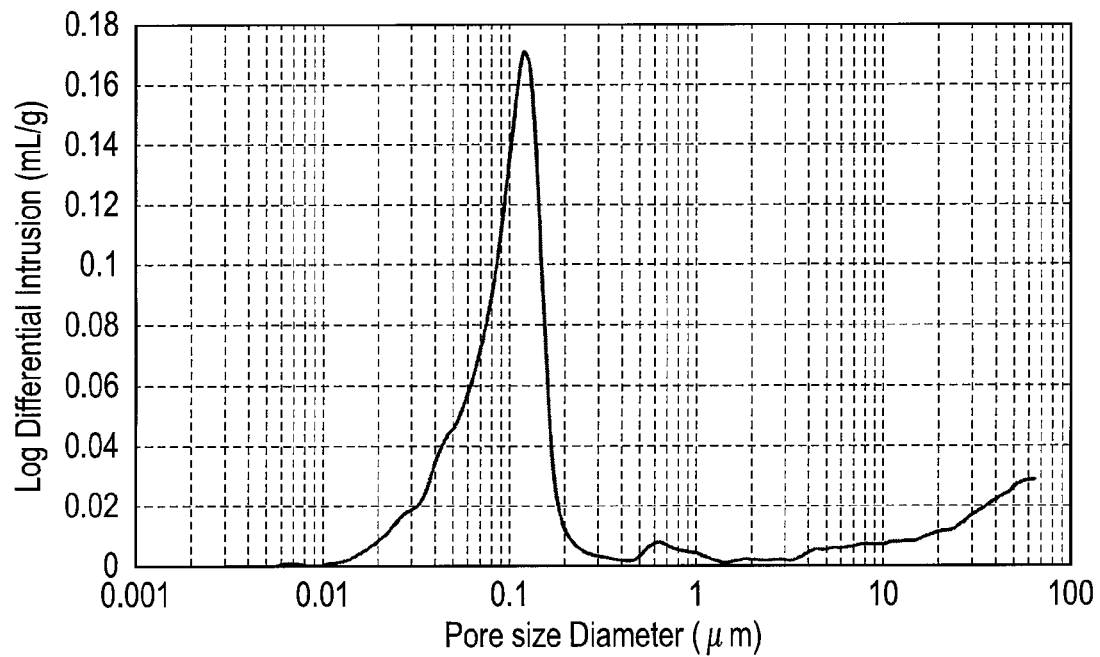
FIG. 7 is a pore distribution chart of a positive electrode of Example 1 according to the mercury porosimetry.
Figure 8:
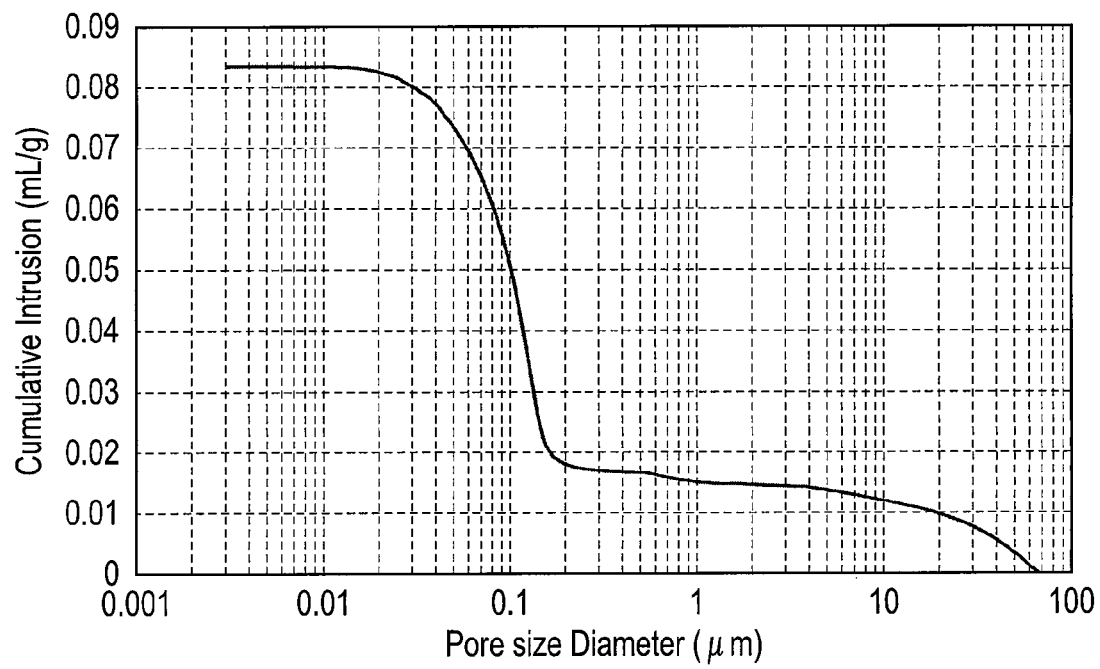
FIG. 8 is a chart showing a cumulative pore volume curve of the positive electrode of Example 1 according to the mercury porosimetry.

A part of the positive electrode is cut into a sample strip having a width of about 25 mm, and it was put in a cell for measurement, and then measurement is performed using Shimadzu Auto-Pore 9520 as a measuring device. Measuring conditions including an initial pressure and a terminal pressure are as described above. A Log Differential Intrusion distribution curve and a cumulative pore volume curve, obtained from the measurement, are shown in FIG. 7 and FIG. 8, respectively. In FIG. 7, a horizontal axis shows a pore diameter (Pore size Diameter), and a vertical axis shows a Log Differential Intrusion. In FIG. 8, a horizontal axis shows a pore diameter (Pore size Diameter), and a vertical axis shows a cumulative pore volume (Cumulative Intrusion). A pore volume V1 was 0.0836 $cm^3/g$ and a pore specific surface area S1 was 3.71 $m^2/g$, obtained from the pore volume curves shown in FIG. 7 and FIG. 8. Values (S1/V1) are shown in Table 1.

When an X-ray diffraction pattern using CuKα as a radiation source of the positive electrode material layer is measured in the same method as above, an X-ray diffraction pattern shown in FIG. 9 was obtained. An arbitrary intensity $I_1$ of a main peak appearing in a range of 2θ of 16° to 21° in the X-ray diffraction pattern, and an arbitrary intensity $I_2$ of a main peak appearing in a range of 2θ of 42° to 47° were calculated according to the method described above, and an intensity ratio ($I_2/I_1$) was found. The intensity ratio ($I_2/I_1$) was 0.212.

Figure 10:
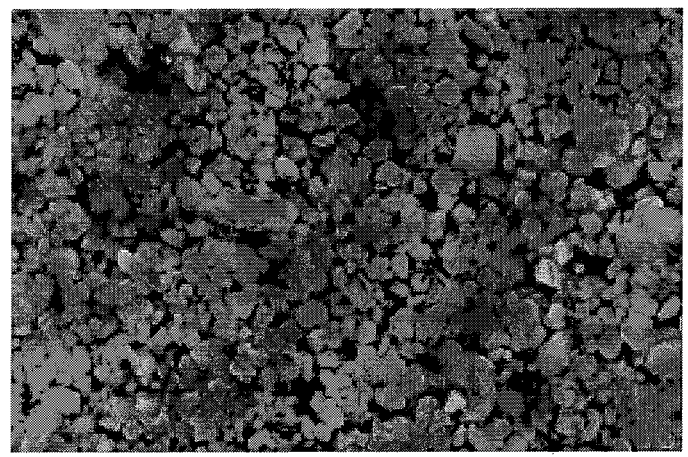
FIG. 10 is a view showing a scanning electron micrograph of the positive electrode of Example 1.

A photograph of a scanning electron microscopy imaging of the positive electrode surface is shown in FIG. 10.

<Production of Negative Electrode>

$Li_4Ti_5O_{12}$ as a negative electrode active material, graphite as an electron conductive substance, and PVdF as a binder were prepared.

Subsequently, 90 parts by weight of $Li_4Ti_5O_{12}$, 5 parts by weight of graphite and 5 parts by weight of PVdF were dispersed in a solvent of N-methylpyrrolidone (NMP) to prepare slurry. This slurry was applied to both surfaces of an aluminum foil current collector having a thickness of 15 μm, and it was dried and press-molded to produce a negative electrode in which negative electrode material layers having a thickness of a 65 μm and a density of 2.40 $g/cm^3$ are formed on the both surfaces of a current collector.

<Preparation of Nonaqueous Electrolyte>

A liquid nonaqueous electrolyte was prepared by mixing 1.5 M of LiPF6 with a mixed solvent of PC and DEC in a volume ratio of 1:2.

<Assembly of Battery>

A rectangular cylindrical container having a bottom and formed from aluminum with a thickness of 0.3 mm, and an aluminum lid in which the positive electrode terminal was inserted and a negative electrode terminal was inserted through an insulating resin by caulking were prepared. After a separator made from a cellulose unwoven fabric having a thickness of 15 μm was impregnated with the nonaqueous electrolyte, the positive electrode was covered with the separator, and the negative electrode was put on the positive electrode through the separator so that the negative electrode faced the positive electrode, which was spirally wound to produce a spiral electrode group having lead tabs which extend from the positive electrode and the negative electrode. This electrode group was pressed into a flat plate. The positive electrode lead tab of the flat electrode group was connected to one end of the positive electrode terminal of the lid, and the negative electrode lead tab was connected to one end of the negative electrode terminal. The electrode group was inserted in the container through an opening thereof, and the lid was welded to the opening of the container. A rectangular nonaqueous electrolyte battery having a structure shown in FIG. 1, and having a thickness of 3.0 mm, a width of 35 mm and a height of 62 mm was produced by the steps described above.

The obtained battery was placed under a 60° C. atmosphere, and a cycle test in which the battery was charged at a current value of 2 C until a voltage reached 2.8 V, and then discharged at a current value of 2 C until a voltage reached 1.8 V was performed. After 4000 cycles, a capacity retention percentage was 83% (a discharge capacity at one cycle was assumed as 100%) and a resistance at that time was 1.45 times the initial resistance.

Example 2

A battery was produced in the same method as in Example 1 except that as the first positive electrode active material, $LiNi_{0.6}Co_{0.2}Mn_{0.2}O_2$ having a V2 of 0.4038 $cm^3/g$, an S2 of 0.87 $m^2/g$, a Log Differential Intrusion at a peak appearing in a range of a pore size of 0.01 to 0.5 μm of 0.002 $cm^3/g$, and a mode diameter of values shown in Table 1 below was used.

Example 3

A battery was produced in the same method as in Example 1 except that the pulverizing time in the automatic mortar was 30 minutes, and press-molding was performed so that the positive electrode material layer had a density of 3.30 $g/cm^3$ in positive electrode press conditions of a roll temperature of 20° C. and a line pressure of 60 kN.

Example 4

A battery was produced in the same method as in Example 1 except that the pulverizing time in the automatic mortar was 5 minutes, and press-molding was performed so that the positive electrode material layer had a density of 3.30 g/cm³ in positive electrode press conditions of a roll temperature of 80° C. and a line pressure of 15 kN.

Example 5

A battery was produced in the same method as in Example 1 except that as the first positive electrode active material, $LiNi_{0.6}Co_{0.2}Mn_{0.2}O_2$ having a V2 of 0.2984 cm³/g, an S2 of 0.48 m²/g, a Log Differential Intrusion at a peak appearing in a range of a pore size of 0.01 to 0.5 μm of 0.001 cm³/g, and a mode diameter of values shown in Table 1 below was used.

Example 6

A battery was produced in the same method as in Example 1 except that as the first positive electrode active material, $LiNi_{0.6}Co_{0.2}Mn_{0.2}O_2$ having a V2 of 0.7556 cm³/g, an S2 of 1.45 m²/g, a Log Differential Intrusion at a peak appearing in a range of a pore size of 0.01 to 0.5 μm of 0.001 cm³/g, and a mode diameter of values shown in Table 1 below was used.

Example 7

A battery was produced in the same method as in Example 1 except that a polyethylene film having a thickness of 15 μm was used as the separator.

Comparative Example 1

Figure 11:
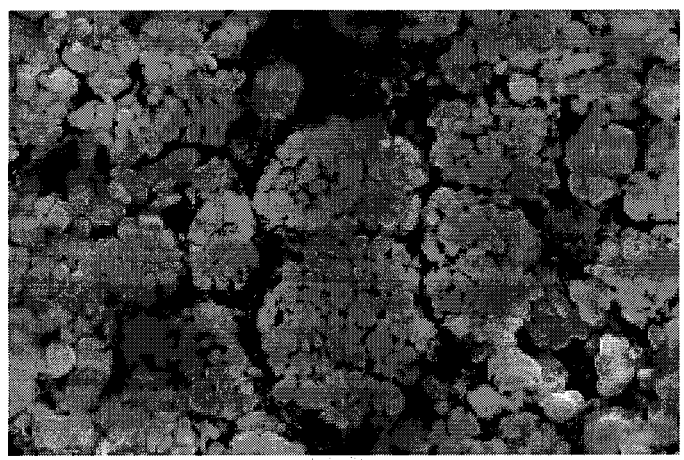
FIG. 11 is a view showing a scanning electron micrograph of a positive electrode of Comparative Example 1.

A battery was produced in the same method as in Example 1 except that the pulverization using the automatic mortar was not performed, and slurry was prepared in a bead mill using 0.3 mm beads dispersing at a peripheral speed of 200 rpm for 10 minutes. A photograph of a scanning electron microscopy imaging of the positive electrode surface was shown in FIG. 11.

Comparative Example 2

A battery was produced in the same method as in Example 1 except that after the pulverization was performed in an automatic mortar for 2 hours, slurry was prepared in a bead mill using 2.0 mm beads dispersing at a peripheral speed of 2000 rpm for 60 minutes. A photograph of a scanning electron microscopy imaging of the positive electrode surface was shown in FIG. 12.

$(I_2/I_1)$ obtained from XRD, V1, S1, (S1/V1), V2, S2, a peak value in a range of 0.01 to 0.5 μm, and a mode diameter of each positive electrode are put together in Table 1 below. A capacity retention percentage and a resistance increase rate after 4000 cycles in the cycle test under a 60° C. atmosphere are also put together in Table 1.

TABLE 1

| | $I_2/I_1$ | V1 (cm³/g) | S1 (m²/g) | S1/V1 | V2 (cm³/g) | S2 (m²/g) | Peak value in a range of 0.01-0.5 μm (cm³/g) | Mode diameter (μm) | Capacity retention percentage (%) | Resistance increase |
|---|---|---|---|---|---|---|---|---|---|---|
| Example 1 | 0.212 | 0.0836 | 3.71 | 44.38 | 0.4448 | 1.11 | 0.017 | 1.6 | 83 | 1.45 |
| Example 2 | 0.212 | 0.0867 | 3.81 | 43.94 | 0.4038 | 0.87 | 0.002 | 1.8 | 78 | 1.48 |
| Example 3 | 0.118 | 0.0782 | 3.85 | 49.23 | 0.4448 | 1.11 | 0.017 | 1.6 | 84 | 1.65 |
| Example 4 | 0.252 | 0.0902 | 3.55 | 39.36 | 0.4448 | 1.11 | 0.017 | 1.6 | 75 | 1.4 |
| Example 5 | 0.233 | 0.0933 | 3.5 | 37.51 | 0.2984 | 0.48 | 0.001 | 4.5 | 72 | 1.39 |
| Example 6 | 0.125 | 0.0742 | 3.88 | 52.29 | 0.7556 | 1.45 | 0.001 | 1.2 | 85 | 1.85 |
| Example 7 | 0.212 | 0.0836 | 3.71 | 44.38 | 0.4448 | 1.11 | 0.017 | 1.6 | 80 | 1.77 |
| Comparative Example 1 | 0.511 | 0.1088 | 3.45 | 31.71 | 0.4448 | 1.11 | 0.017 | 1.6 | 50 | 1.32 |
| Comparative Example 2 | 0.072 | 0.0638 | 4.55 | 71.32 | 0.4448 | 1.11 | 0.017 | 1.6 | 83 | 3.12 |

As apparent from Table 1, in Examples 1 to 7, the capacity retention percentage is high after 4000 cycles in the cycle test under a 60° C. atmosphere, and the resistance increase is small after the cycles. As apparent from the scanning electron microscopy imaging of FIG. 10, in Examples 1 to 7, the secondary particles and the independent primary particles which did not form the secondary particle were intermixed. Log Differential Intrusions at a peak appearing in a range of a pore size of 0.01 to 0.5 μm in Examples 1, 3, 4 and 7 are in a range of 0.005 cm³/g to 0.1 cm³/g.

On the other hand, in Comparative Example 1 in which the value of (S1/V1) is less than 35, the capacity retention percentage is lower than those in Examples 1 to 7. As apparent from the scanning electron microscopy imaging of FIG. 11, in the positive electrode of Comparative Example 1, the ratio of the secondary particles is higher than those in Examples. In Comparative Example 2 in which the value of (S1/V1) is more than 70, the resistance increase is higher than those in Examples 1 to 7. As apparent from the scanning electron microscopy imaging of FIG. 12, in the positive electrode of Comparative Example 2, the ratio of the primary particles is higher than those in Examples.

The comparison of the values V2 shows that the resistance increases in Examples 1 to 5 and 7 in which V2 is in a range of 0.3 cm³/g to 0.75 cm³/g are smaller than that in Example 6 in which V2 is more than 0.75 cm³/g.

Examples 8 and 9

A battery was produced in the same method as in Example 1 except that the intensity ratio $(I_2/I_1)$, S1, V1, (S1/V1), a peak value in a range of 0.01 to 0.5 μm, and a mode diameter are shown in Table 2.

Examples 10 to 16

A battery was produced in the same method as in Example 1 except that as first positive electrode active material, oxides having a composition and an average particle size shown in Table 3 were used instead of $LiNi_{0.6}Co_{0.2}Mn_{0.2}O_2$ having an average particle size of 5 μm.

($I_2/I_1$) obtained from XRD, V1, S1, (S1/V1), V2, S2, a peak value in a range of 0.01 to 0.5 µm, and a mode diameter of each positive electrode are put together in Table 2 below. A capacity retention percentage and a resistance increase rate after 4000 cycles in the cycle test under a 60° C. atmosphere at that time are also put together in Table 2.

TABLE 2

|  | $I_2/I_1$ | V1 (cm$^3$/g) | S1 (m$^2$/g) | S1/V1 | V2 (cm$^3$/g) | S2 (m$^2$/g) | Peak value in a range of 0.01-0.5 µm (cm$^3$/g) | Mode diameter (µm) | Capacity retention percentage (%) | Resistance increase |
|---|---|---|---|---|---|---|---|---|---|---|
| Example 8 | 0.312 | 0.1006 | 3.52 | 35 | 0.4448 | 1.11 | 0.017 | 1.6 | 69 | 1.35 |
| Example 9 | 0.085 | 0.0640 | 4.48 | 70 | 0.4448 | 1.11 | 0.017 | 1.6 | 84 | 2.48 |
| Example 10 | 0.223 | 0.0843 | 3.70 | 43.89 | 0.4562 | 1.15 | 0.015 | 1.8 | 83 | 1.43 |
| Example 11 | 0.219 | 0.0832 | 3.68 | 44.23 | 0.4452 | 1.17 | 0.015 | 1.7 | 85 | 1.43 |
| Example 12 | 0.220 | 0.0836 | 3.67 | 43.90 | 0.4591 | 1.20 | 0.012 | 1.7 | 82 | 1.48 |
| Example 13 | 0.228 | 0.0829 | 3.75 | 45.23 | 0.4428 | 1.18 | 0.020 | 1.5 | 80 | 1.50 |
| Example 14 | 0.221 | 0.0832 | 3.72 | 44.71 | 0.4471 | 1.13 | 0.018 | 1.6 | 78 | 1.68 |
| Example 15 | 0.215 | 0.0840 | 3.70 | 44.05 | 0.4603 | 1.09 | 0.017 | 1.8 | 75 | 1.77 |
| Example 16 | 0.227 | 0.0830 | 3.73 | 45.08 | 0.4455 | 1.15 | 0.019 | 1.6 | 89 | 1.51 |

TABLE 3

|  | First positive electrode active material | | Second positive electrode active material | |
|---|---|---|---|---|
|  | Composition | Average particle size (µm) | Composition | Average particle size (µm) |
| Example 10 | LiNi$_{1/3}$Co$_{1/3}$Mn$_{1/3}$O$_2$ | 5 | LiCoO$_2$ | 5 |
| Example 11 | LiNi$_{0.5}$Co$_{0.2}$Mn$_{0.3}$O$_2$ | 5 | LiCoO$_2$ | 5 |
| Example 12 | LiNi$_{0.4}$Co$_{0.3}$Mn$_{0.3}$O$_2$ | 5 | LiCoO$_2$ | 5 |
| Example 13 | LiNi$_{0.7}$Co$_{0.1}$Mn$_{0.2}$O$_2$ | 5 | LiCoO$_2$ | 5 |
| Example 14 | LiNi$_{0.8}$Co$_{0.1}$Mn$_{0.1}$O$_2$ | 5 | LiCoO$_2$ | 5 |
| Example 15 | LiNi$_{0.8}$Co$_{0.15}$Al$_{0.05}$O$_2$ | 5 | LiCoO$_2$ | 5 |
| Example 16 | LiNi$_{0.7}$Co$_{0.15}$Mn$_{0.15}$O$_2$ | 5 | LiCoO$_2$ | 5 |

As apparent from Table 2, in Example 8 in which (S1/V1) is 35 and Example 9 in which (S1/V1) is 70, the capacity retention percentages after 4000 cycles in the cycle test under a 60° C. atmosphere are higher than that of Comparative Example 1 and the resistance increases after the cycles are smaller than that of Comparative Example 2. In addition, as shown in Examples 10 to 16, even if the composition of the first positive electrode active material is altered, when the value of (S1/V1) is adjusted to 35 or more and 70 or less, the capacity retention percentages after 4000 cycles in the cycle test under a 60° C. atmosphere are higher than that of Comparative Example 1 and the resistance increases after the cycles are smaller than that of Comparative Example 2.

According to the nonaqueous electrolyte batteries in Examples described above, the capacity retention percentage after cycles at a high temperature can be improved and the resistance increase after the cycles can also be inhibited.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A positive electrode comprising:
a positive electrode material layer comprising a positive electrode active material having a composition represented by a formula (1), wherein the positive electrode material layer satisfying formula (2); and
a positive electrode current collector on which the positive electrode material layer is formed;

$$Li_xNi_{1-a-b}Co_aM_bO_2 \quad (1)$$

wherein
M is at least one element selected from the group consisting of Mg, Al, Mn, Si, Ti, Zn, Zr, Ca and Sn;
x, a and b satisfy $0.9 < x \leq 1.25$, $0 < a \leq 0.4$, and $0 \leq b \leq 0.45$;

$$35 \leq S1/V1 \leq 70 \quad (2)$$

wherein S1 is a pore specific surface area of the positive electrode material layer, obtained by a pore distribution measurement of pores having a pore diameter of from 0.003 to 60 µm according to a mercury porosimetry, and V1 is a pore volume obtained by the pore distribution measurement, and
wherein the positive electrode material has a mode diameter in a range of 1.2 µm to 4.5 µm in a pore distribution obtained by a pore distribution measurement of pores having a pore diameter of from 0.003 to 60 µm according to a mercury porosimetry.

2. The positive electrode according to claim 1, wherein the electrode satisfies formula (3):

$$0.12 \leq I_2/I_1 \leq 0.24 \quad (3)$$

wherein
$I_1$ is an intensity of a main peak appearing in a range of 2θ of 16° to 21° in an X-ray diffraction pattern using CuKα as a radiation source on a surface of the positive electrode material layer; and
$I_2$ is an intensity of a main peak appearing in a range of 2θ of 42° to 47° in the X-ray diffraction pattern.

3. The positive electrode according to claim 1, wherein the positive electrode active material has a pore volume V2 in a range of 0.3 cm$^3$/g to 0.75 cm$^3$/g, obtained by the pore distribution measurement according to the mercury porosimetry.

4. A nonaqueous electrolyte battery, comprising:
a positive electrode according to claim 1;
a negative electrode;
a separator between the positive electrode and the negative electrode; and
a nonaqueous electrolyte.

5. The nonaqueous electrolyte battery according to claim 4, wherein the separator comprises at least one polymer selected from the group consisting of cellulose, polyethylene terephthalate and vinylon.

6. A battery pack comprising:
the nonaqueous electrolyte battery according to claim 4.

7. The positive electrode according to claim 1, wherein the positive electrode active material has a pore volume V2 in a range of 0.4 cm$^3$/g to 0.6 cm$^3$/g, obtained by the pore distribution measurement according to the mercury porosimetry.

8. The positive electrode according to claim 1, wherein the positive electrode active material has a pore specific surface area S2 in a range of 0.5 m$^2$/g to 1.4 m$^2$/g, obtained by the pore distribution measurement according to the mercury porosimetry.

9. The positive electrode according to claim 1, wherein the positive electrode active material has a pore specific surface area S2 in a range of 0.7 m$^2$/g to 1.2 m$^2$/g, obtained by the pore distribution measurement according to the mercury porosimetry.

10. The positive electrode according to claim 1, wherein the positive electrode active material has an average particle size of 1 μm or more and 30 μm or less.

11. The positive electrode according to claim 1, wherein the positive electrode active material has an average particle size of 1 μm or more and 15 μm or less.

12. The positive electrode according to claim 1, wherein the positive electrode material layer further comprises:
at least one binder selected from the group consisting of polytetrafluoroethylene (PTFE), poly(vinylidene fluoride) (PVdF), and fluorine-comprising rubber; and
at least one electron conductive substance selected from the group consisting of acetylene black, carbon black and graphite.

13. The positive electrode according to claim 1, wherein a mixing ratio of the positive electrode active material, the electron conductive substance and the binder is:
from 73 to 95% by weight of the positive electrode active material;
from 3 to 20% by weight of the electron conductive substance; and
from 2 to 7% by weight of the binder.

14. The positive electrode according to claim 1, wherein the positive electrode material layer comprises a pore having a pore diameter of 60 μm.

15. The positive electrode according to claim 1, wherein the positive electrode active material has a mode diameter in a range of 1.6 μm to 4.5 μm in the pore distribution obtained by the mercury porosimetry.

* * * * *